July 1, 1969 D. G. BASTIAN 3,452,623
AGGREGATE MOTION DRIVE MECHANISM
Filed June 29, 1967 Sheet 3 of 4

United States Patent Office

3,452,623
Patented July 1, 1969

3,452,623
AGGREGATE MOTION DRIVE MECHANISM
Donald G. Bastian, Rochester, N.Y., assignor to
Friden, Inc., a corporation of Delaware
Filed June 29, 1967, Ser. No. 649,941
Int. Cl. F16h 21/40
U.S. Cl. 74—81                                   15 Claims

ABSTRACT OF THE DISCLOSURE

A mechanism for selectable amounts of aggregate motion drive has a drive crank shaft coupled by plural connecting links to the articulation point of individual ones of plural toggle joint structure having toggle arms intercoupling a spring-loaded longitudinally-reciprocal guide member and a latchable bell crank supported for free pivotal motion about the axis of a driven output shaft. Bevel planetary gears supported on the bell cranks for rotation about a bell-crank radius are intercoupled in successive pairs by bevel gearing supported for free rotation on the output shaft, an end bevel gear being connected to the output shaft. Selective unlatching of any one or more of the bell cranks permits toggle-joint-structure pivotal drive motion thereof, and the resultant planetary motion of the associated planetary effects corresponding bevel gear angular drive of the output shaft through an angle of bi-directional step magnitude in aggregate reflecting the number and order positioning of each ball crank selectively unlatched.

---

The present invention relates to aggregate motion drive mechanisms and particularly to such mechanisms for converting rotary motion of an input drive shaft to angularly reciprocal motion of an output shaft with selectably controlled ranges of angular reciprocation.

It is often desirable in mechanical structures mechanically to convert the drive power of an input rotational shaft to an angular reciprocal motion of an output driven shaft for drive power utilization. Certain applications may require selection of any one of plural ranges of angular drive motion of the output shaft, and may further require that such selection be accomplished by control from a more or less remote point. Mechanisms heretofore proposed for rotary to reciprocal drive motion have taken numerous forms, but substantially all of these are usually unsuited for transmitting large values of drive power especially at high cyclic rates and with selectable ranges of angular reciprocation or of doing so with consistently precise control over the limits of angular displacements of the output shaft. The relatively few mechanisms having all of the desirable attributes last mentioned are generally of undesirably complex and expensive construction often requiring excessive maintenance attention, and in addition are of such large and bulky size as not to have utility in applications where compactness is an important consideration. Typical of such applications requiring compact drive structures is the high speed printing machine disclosed and claimed in the copending Bethune application Ser. No. 649,940, filed concurrently herewith.

It is an object of the present invention to provide a new and improved aggregate motion drive mechanism of study construction capable of transmitting large drive forces from a rotary input shaft to angular reciprocal motion of an output shaft.

It is a further object of the invention to provide an improved aggregate motion drive mechanism capable of transmitting large values of drive power from a rotary input shaft to an output shaft which is reciprocally movable over ranges of angular motion each having precisely selectable range limits and each being easily and readily selectable and controlled by relatively low power range-selection devices preferably of the electrically operated type enabling angular range selection and control from a remote point.

It is an additional object of the invention to provide an aggregate motion drive mechanism which, by cyclic storage of input drive power and cyclic transmission of the stored power through the mechanism to the output shaft, more uniformly loads the input drive source throughout an operating cycle and is characterized by a higher cyclic operating rate than heretofore readily attainable in rotary to reciprocal drive mechanisms capable of transmitting large values of drive power.

In accordance with the present invention, an aggregate motion drive mechanism comprises a plurality of toggle joint structure each having articulated toggle arms, a corresponding plurality of reciprocal power drive members each connected to the toggle joint of an individual one of the toggle joint structures, means including an input power drive shaft for reciprocating the drive members in unison through reciprocal cycles of motion to displace the articulated arms of the toggle joint structures by toggle motion between two positions thereof, a plurality of displaceable aggregate motion control elements positionally arranged in order from a first to a last thereof and mechanically coupled to one arm of an individual one of the toggle joint structures for displacement of individual ones of the control elements by individual toggle displacements of the one toggle arm, means mechanically coupling the control elements serially in the order of their arrangement and responsive to the displacement of each thereof to provide an aggregate motion output therefrom, latch means individual to each control element to restrain and permit displacement motion thereby, and restraining means individual to each toggle joint structure for restraining and permitting toggle displacement of the other arm thereof whenever the associated control element is respectively permitted to have displacement motion and restrained therefrom by the latch means.

Other and further advantages of the invention will appear as the detailed description thereof proceeds in the light of the drawings foring a part of this application, and in which.

Figure 1:
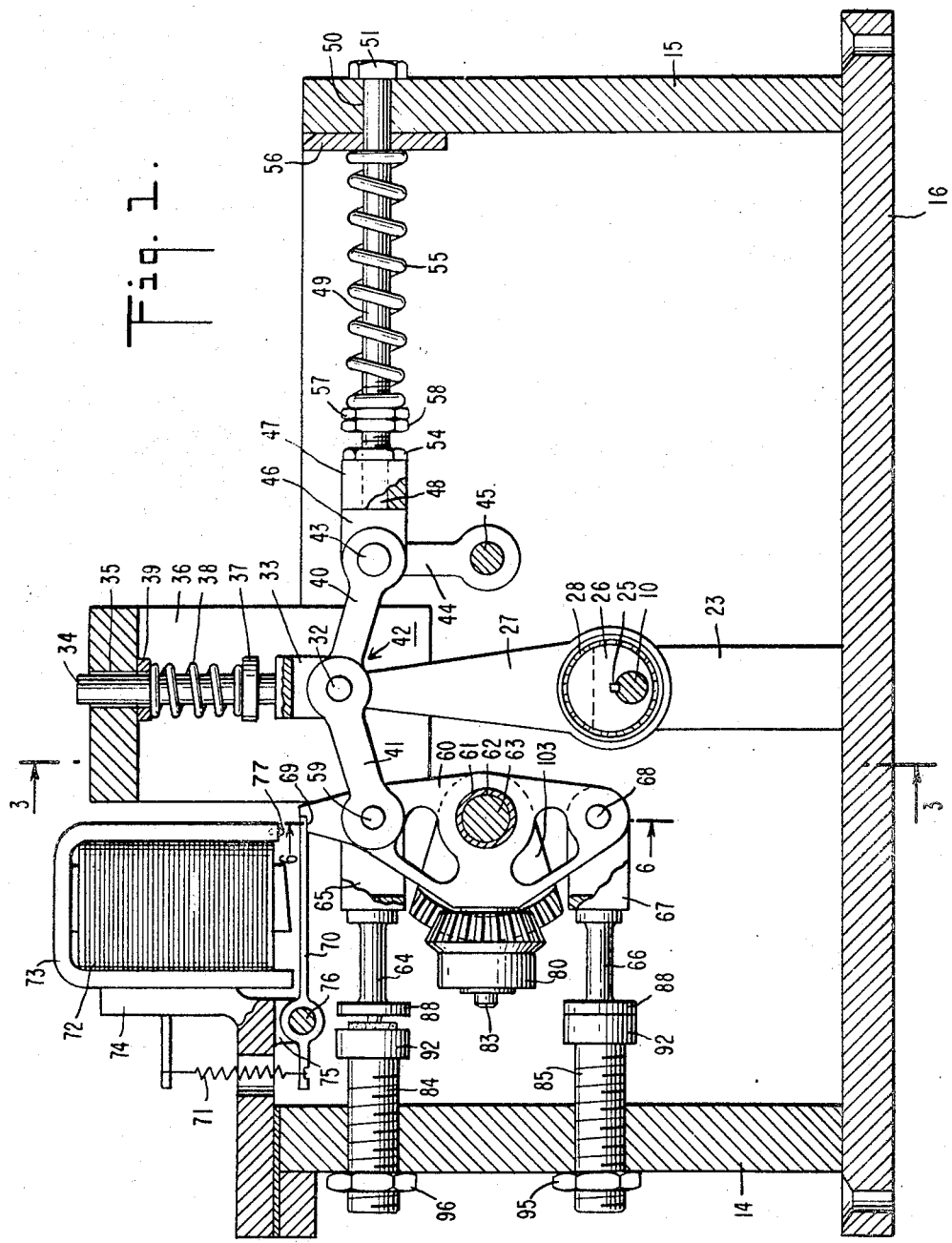
FIG. 1 illustrates in elevational cross-sectional view the construction of an aggregate motion drive mechanism embodying the present invention.
Figure 2:
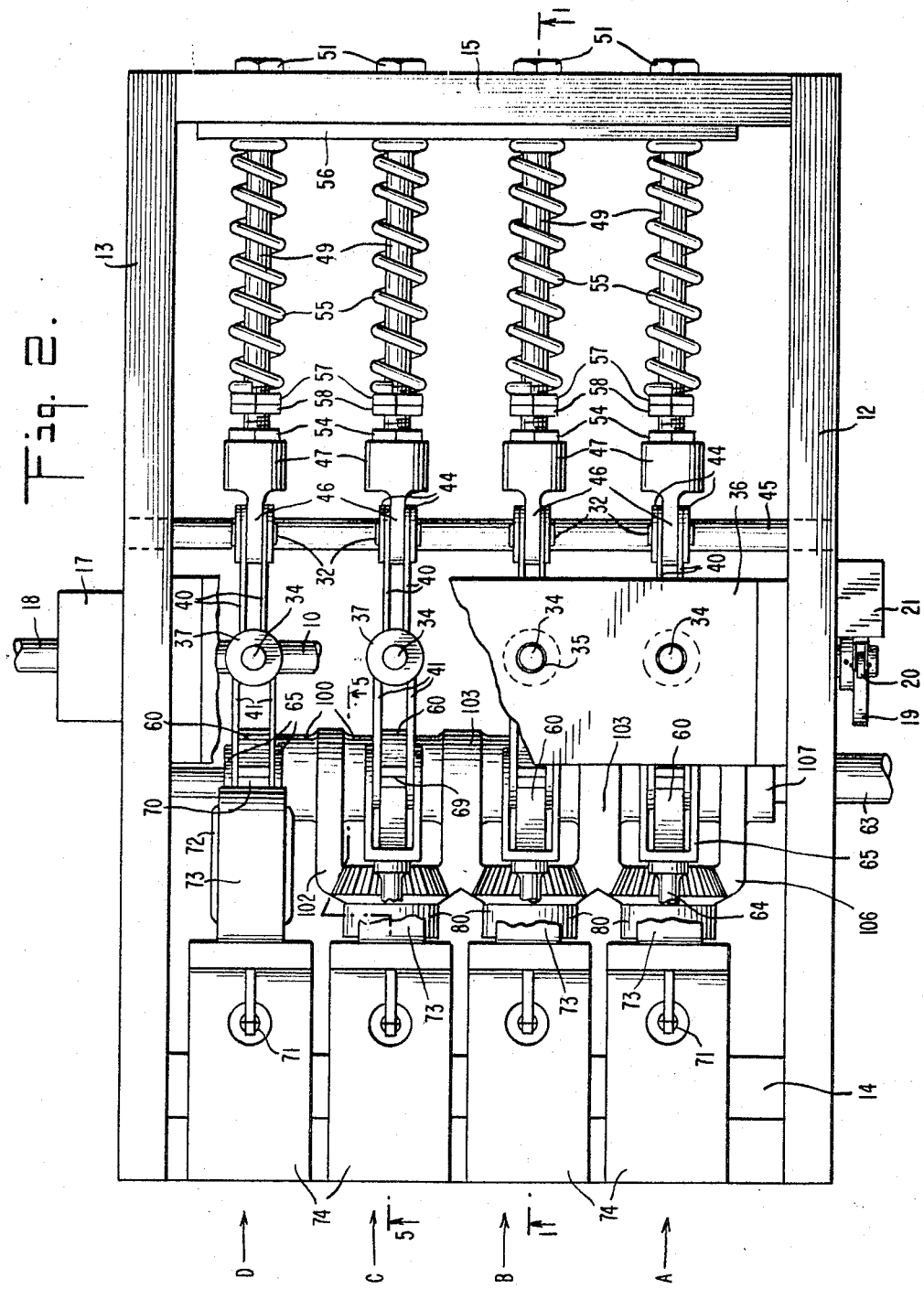
FIG. 2 is a plan view and FIG. 3 an end cross-sectional view further illustrating the construction of FIG. 1.
Figure 3:
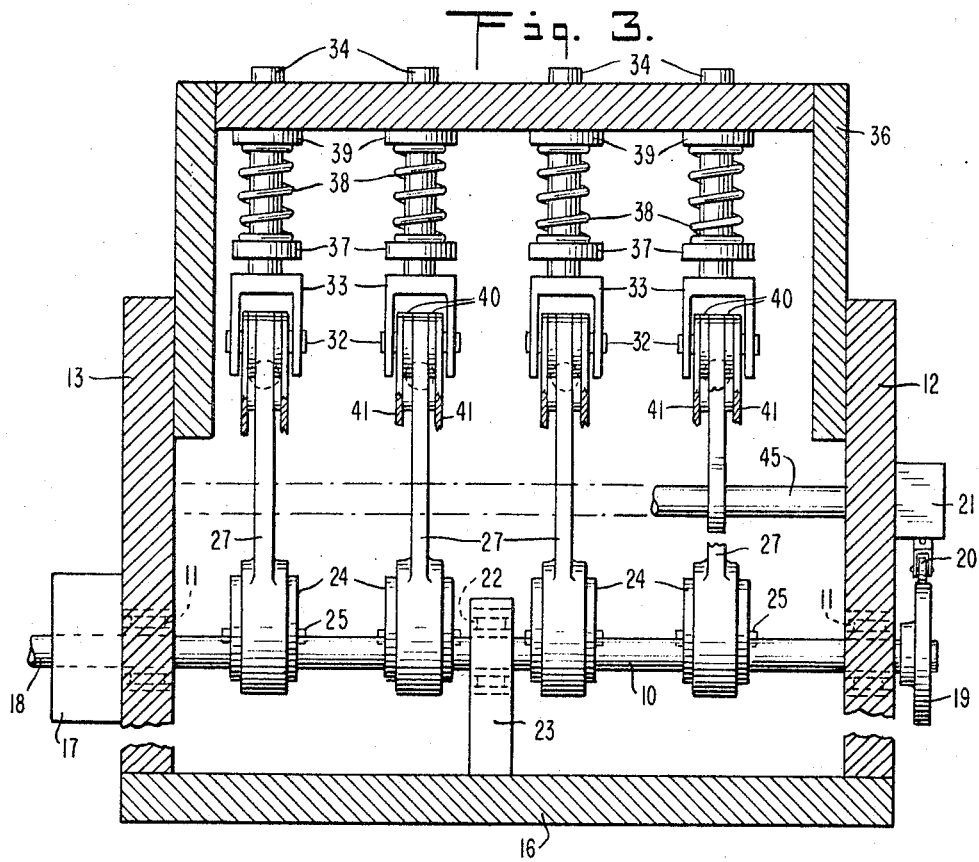

Referring now more particularly to FIGS. 1-3 of the drawings, the aggregate motion drive mechanism of the invention includes an input drive shaft 10 which is journaled by antifriction roller bearings 11 in side walls 12 and 13 of an open frame box support structure having end walls 14 and 15 and a base 16 to which the walls 12-15 are fixedly secured in any suitable manner not shown. The input drive shaft 10 is selectably operated through operating cycles each comprised by a complete shaft revolution. Each such cyclic operation is controlled by a clutch 17, preferably of the electromagnetically controlled single revolution helical spring wire type such as shown in the U.S. Patent No. 3,084,857, which receives drive power from a shaft 18 driven at constant angular velocity by a drive source (not shown). The end of the shaft 10 remote from the clutch 17 has affixed thereto a cam 19 engaged by a cam follower 20 which operates a microswitch 21, through the contacts of which code electromagnets hereinafter described are briefly energized in common and in timed relation to the cyclic rotation of the drive shaft 10.

As shown more clearly in FIG. 3, the drive shaft 10 is centrally supported by an antifriction roller bearing 22 carried by a trunnion 23 secured to the base 16, and there are positioned in spaced relation along the shaft a plurality of eccentric drive structures 24 each secured to the shaft by a key 25. The construction of these eccentric drive structures is shown more clearly in FIG. 1. Each includes an eccentric cam member 26 upon which one end of a connecting link 27 is rotationally supported by intervening antifriction roller bearings 28.

The remote end of each connecting link 27 is pivotally secured by a pin 32 between the arms of a forked member 33 affixed to the end of an elongated guide member 34 of cylindrical cross-section which extends through and is loosely guided for reciprocal and slight angular motion by an aperture 35 provided in a U-shaped bracket 36 secured between the side walls 12 and 13 of the open frame box structure by any suitable means (not shown). Each guide member 34 has an integral collar 37. A helical wire spring 38 is compressed between the collar 37 and a washer 39, slidably positioned on the guide member 34, to provide for the latter a bias force for a reason hereinafter explained.

Each of the pins 32 articulates opposed and spaced pairs of arms 40 and 41 which together comprise a toggle joint structure 42. The remote ends of each pair of toggle arms 40 is pivotally secured by a pin 43 to a pair of spaced arms 44 pivotally supported on a rod 45 secured between the side frames 12 and 13 of the frame structure. The toggle arms 40 are also pivotally secured by the pin 43 to the flattened end 46 of a member 47 having a central internally threaded bore 48 into which the end of a machine screw 49 is threaded. The machine screw 49 is guided for longitudinal and small pivotal motion by a slightly over-size aperture 50 provided in the end wall 15 of the frame structure and has a hexagonal head 51 by which the machine screw 49 may be adjustably screwed into or out of the member 47 to provide an adjustable length of these members fixing the at-rest spacing of the axis of the pin 43 in relation to a vertical plane which passes through the axis of the drive shaft 10. The adjusted length of the machine screw 49 and member 47 is secured by a lock nut 54. The head 51 of the machine screw 49 is normally biased into engagement with the exterior surface of the end wall 15 by a helical wire spring 55 which surrounds the machine screw 49 and is compressed between a washer plate 56, slidably positioned on the machine screws, and a nut 57 threaded on the end of the machine screw. The compressive force of the spring 55, provided for a purpose presently to be explained, is adjusted by the adjustable position of the nut 57 on the machine screw and this adjusted position is maintained by a lock nut 58.

The remote ends of each opposed pair of toggle joint arms 41 are pivotally connected by a pin 59 to the upper arm (as seen in FIG. 1) of a lever 60 having a central aperture 61 with Babbitt metal sleeve liner 62 for free pivotal support of the lever 60 upon a driven output shaft 63 journaled in the side walls 12 and 13 of the open frame support structure. Each lever 60 is pivotally displaceable by the associated toggle joint structure 42 in a manner presently to be explained, and in being so displaced moves through a cycle of counterclockwise and clockwise pivotal motion as seen in FIG. 1. The limit of such counterclockwise motion is established by a reciprocal stop member 64 of a stop structure more fully described hereinafter and which has an end fork portion 65 pivotally secured by the pin 59 to the associated lever 60. The limit of clockwise motion of each lever 60 is established by a stop member 66 similar to the stop member 64 and likewise having a forked end portion 67 pivotally secured by a pin 68 to the lower end of the associated lever 60. The upper end of each lever 60 is provided with a notch 69 which, in the counterclockwise limiting position of the lever 60, is engaged by the end of an armature 70 biased into such engagement by a spring 71 during the deenergized state of a code electromagnet 72. The latter has an E-shaped magnetic yoke structure 73 secured in conventional manner (as by machine screws, not shown) to a bracket 74 secured in any convenient manner (not shown) to the upper edge of the end wall 14 of the open box frame. The bracket 74 has a depending projection 75 to which a pin 76 is secured for pivotal suport of the armature 70 as shown. A non-magnetic stop insert 77 prevents sticking of the armature 70 in attracted position.

Figure 4:
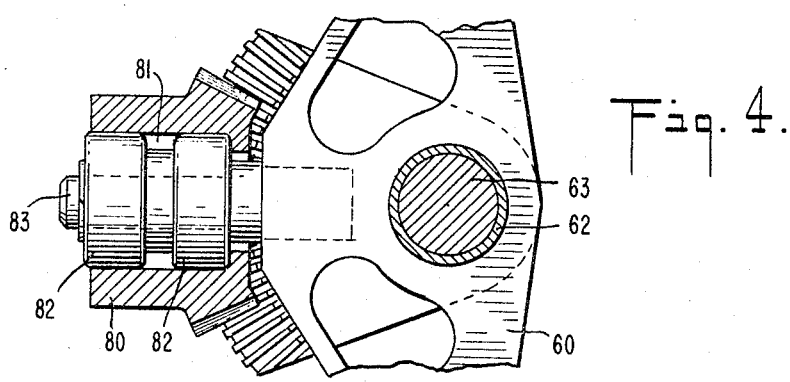
FIG. 4 is an enlarged fragmentary view partly in cross section illustrating a detail of the FIG. 1 construction.

As seen more clearly in FIGS. 1 and 2, the three levers 60 nearest the side wall 12 are of triangular configuration and support at their apex a planetary bevel pinion gear 80 in a manner shown more clearly in FIG. 4. The pinion gear 80 has an axially concentric hollow bore 81 within which roller bearing assemblies 82 are pressed and the latter in turn are press-fitted upon a pin 83 secured in radially extending relation on the lever 60.

Figure 5:
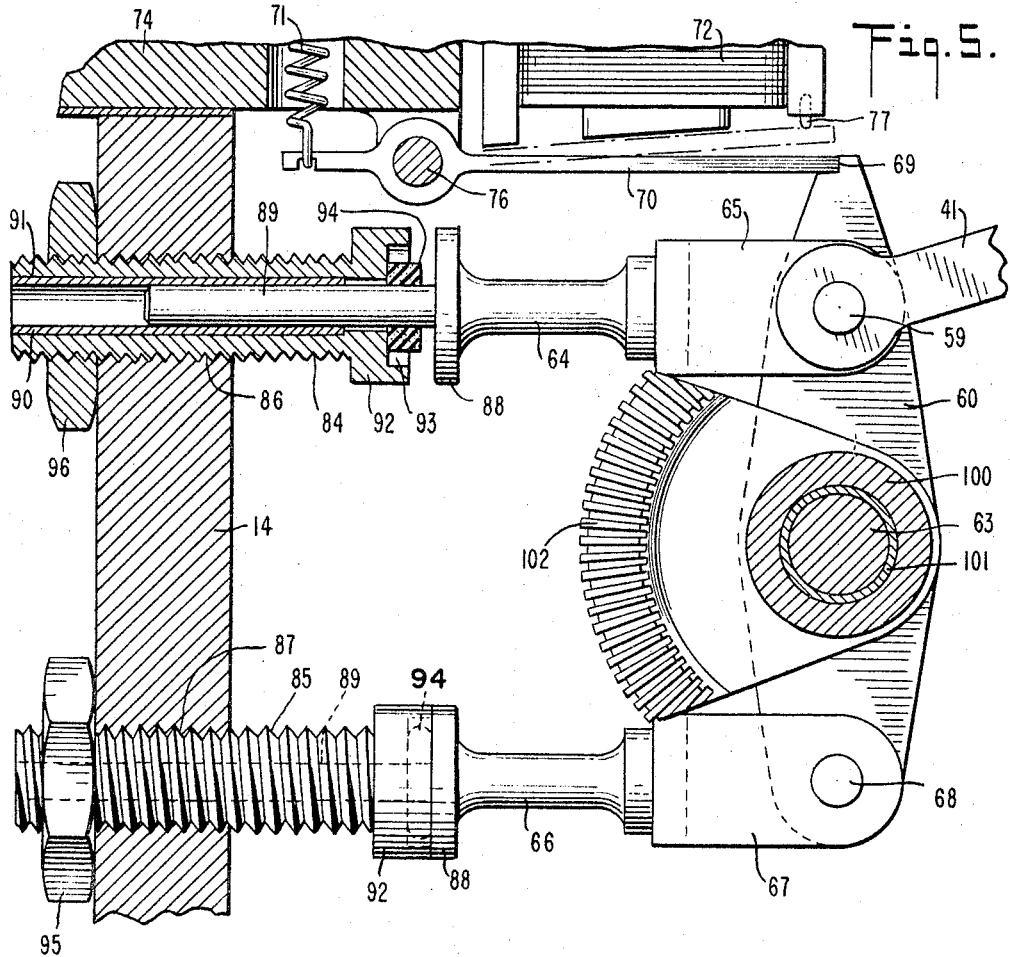
FIG. 5 is an enlarged fragmentary view partly in cross section illustrating certain details of the FIG. 1 construction.

FIG. 5 illustrates in enlarged partially cross-sectioned view the construction of the stop members 64 and 66 and their arrangement with respective associated guide bushings 84 and 85. The latter have external screw threads as shown and are threaded through respective internally threaded apertures 86 and 87 of the end wall 14. The stop members 64 and 66 and associated guide bushings 84 and 85 have the same constructions, and each stop member includes an integrally formed stop flange 88 and an axially projecting guide portion 89 which is reciprocally guided by a Babbitt metal bearing sleeve 90 into an axial bore 91 of the guide bushing. Each guide bushing terminates at its right-hand end, as seen in FIG. 5, in a flanged head 92 which has an end concentric bore 93 in which is cemented or otherwise affixed a bushing 94 of resilient material such as neoprene serving to cushion the stop engagement of the stop flange 88 with the end surface of the flanged head 92. The limit of clockwise angular motion of the lever 60 is established by engagement of the flanged head 88 of the stop member 66 with the flanged head 92 of the guide bushing 85, and the latter is positioned longitudinally by rotational adjustment to adjust the clockwise stop limit of the lever 60 such that the vertical notch surface of its notch 69 is slightly spaced from the end surface of the armature 70 to permit free pivotal motion of the armature. This adjusted position of the guide bushing 85 is fixed by a lock nut 95. Upon energization of the electromagnet 72 to attract its armature 70 and pivot the latter to a position indicated in broken lines, the end of the armature is withdrawn from latching engagement with the notch 69 of the lever 60 and the latter may thereupon be angularly displaced in counterclockwise direction as seen in FIG. 5. The limit of its counterclockwise displacement is established by engagement of the stop flange 88 of the stop member 64 with the end surface of the flanged head 92 of the guide bushing 84. This stop position is established by rotational adjustment of the guide bushing 84 and the adjusted position of the latter is fixed by a lock nut 96. The precise stop limits to be effected by adjustment of each of the several guide bushings 84 will be considered more fully hereinafter.

Figure 6:
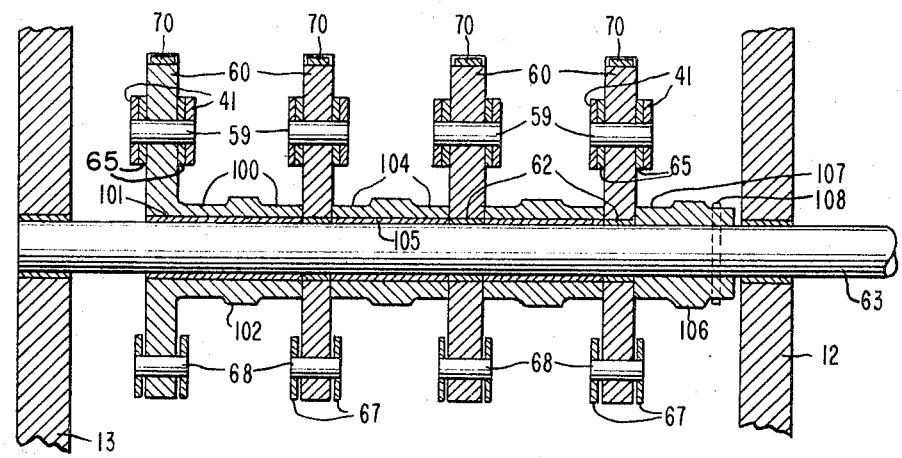
FIG. 6 is an enlarged cross-sectional view illustrating further details employed in the FIG. 1 construction.

FIG. 5 also illustrates more clearly the configuration of the lever most remotely spaced from the side wall 12 of the box frame, and in conjunction with FIG. 6 illustrates the different construction of this lever from that of the three levers 60 more closely spaced to the side wall 12. As shown in FIG. 6, this remotely spaced lever 60 is provided with an integrally formed and axially extending hub 100 having an axial bore into which a Babbitt metal bearing sleeve 101 is pressed for pivotal support of the lever upon the output shaft 63. Centrally positioned and affixed to the hub 100 is a bevel sector gear 102 which, as more clearly shown in FIG. 2, drivingly engages the planetary bevel pinion gear 80 carried by the adjacent lever 60. As also more clearly shown in FIGS. 2 and 6, double bevel sector gears 103 drivingly engage adjacent pairs of the planetary bevel pinion gears 80 and are centrally supported upon hubs 104 having ends abutting adjacent pairs of the levers 60 and pivotally supported by Babbit metal bearing sleeves 105 upon the output shaft 63. An endmost bevel sector gear 106, drivingly engaging the endmost planetary bevel pinion gear 80, is supported by a hub 107 which in turn is supported upon and fixedly secured to the shaft 63 by a pin 108.

It will be apparent from the foregoing description of the construction of the aggregate motion drive mechanism that there are four similar structures of the type shown in FIG. 1 and that each of these is arranged for selective pivotal actuation of a lever 60 by mechanical drive from the drive shaft 10. These four structures are positioned in side-by-side relation as shown in FIG. 2. For convenience in considering the operation of the mechanism these four similar structures are identified in FIG. 2 as structures A–D and will be so referred to hereinafter.

In considering the operation of the aggregate motion drive mechanism just described, assume at the outset that all four of the code electromagnets 72 are deenergized so that their associated armature 70 are positioned in latching engagement with the notch 69 of an associated lever 60. The input drive shaft 10 of the mechanism operating under control of the clutch 17 makes one complete revolution for each actuation of the clutch. This revolution starts from and ends at an at-rest or home position of the shaft 10 which, as shown in FIG. 1, positions the connecting links 27 with uppermost vertical displacements. As the input drive shaft 10 completes a cycle of rotation and displaces the connecting links 27 upwardly, the guide member 34 is corresponding vertically displaced and the helical wire spring 38 becomes compressed between the collar 37 of the guide member 34 and the washer 39 abutting the U-shaped bracket 36. This compression of the spring 38 causes it to store an amount of the input drive power which is then available for release to the input drive shaft 10 as the latter begins and progresses through a subsequent drive revolution. The spring 38 thus operates to place a more uniform load upon the input drive source (not shown, but coupled as previously explained to the input shaft 18), and accordingly may be considered to function as a drive shaft torque rectifier spring. Under code electromagnet controlled drive of the output driven shaft 63 accomplished in a manner presently to be explained, the helical wire spring 38 serves the additional function of preventing the load placed upon the output driven shaft from being applied back through the toggle joint structures 42 and the connecting links 27 to the input drive shaft 10.

As the input drive shaft 10 begins a cycle of rotation, the downward motion of the connecting links 27 begins to move the arms 40 and 41 of the toggle joint structures 42 toward straightened position. Under the assumed condition that all of the code electromagnets 72 are deenergized, the arms 41 of the toggle joint structures 42 pivot around their pivot pins 59 but these are maintained stationary at this time by engagement of the armatures 70 in latched relation with the latch notches 69 of he levers 60. Thus he arms 40 of the toggle joint structures 42 are displaced at this time to the right and their pivot pins 43 displace the machine screws 49 to the right to compress the helical wire springs 55 and thereby store a portion of the input drive power. This stored power is then available for release through the toggle joint structures 42 and connecting links 27 to assist in compressing the helical wire spring 38 and restoring the input drive shaft 10 to its at-rest or home position at the completion of its cycle of rotation.

Assume now that the code electromagnet 72 of the structure A is energized at the time the input drive shaft 10 begins a cycle of rotation. The new cycle of revolution of the input drive shaft 10 in straightening the arms 40 and 41 of the toggle joint structure 42 of the structure A now pivots the lever 60 of this structure in counterclockwise direction as viewed from the output end of the output shaft 63. The levers 60 of the structures B–D remain latched by the deenergized states of their code electromagnets, so that the bevel sector gear 102 of the structure D and the planetary pinion gears 80 of the structures B and C are all maintained stationary. By reason of this fact, both of the double sector gears 103 mechanically intercoupling the structures A–C must also remain stationary. The prevailing angular counterclockwise drive displacement of the lever 60 of the structure A accordingly affects downward planetary movement of its bevel planetary pinion gear 80, which thereupon effects downward displacement of the bevel sector gear 106 to rotate the output shaft 63 in counterclockwise direction as seen from the end of the shaft. The magnitude of this counterclockwise displacement is limited in the structure A by engagement of the stop flange 88 of the associated stop member 64 with the end surface of the flanged head 92 of the associated guide bushing 84. The latter is initially adjusted in a manner earlier explained to establish a preselected unit value of maximum counterclockwise angular displacement of the output shaft 63. This adjustment if desired may be such that the output shaft reaches a limit of angular displacement shortly prior to completion of one-half revolution of the input drive shaft 10 and remains at the displacement limit for a short interval after the input drive shaft 10 rotaates beyond its half cycle position. This provides a dwell interval during which the output drive shaft 63 is stationary at its limit of counterclockwise rotation. Such dwell interval has utility in enabling an operation to be performed by a mechanism coupled for drive by the output driven shaft 63 such as, for example, the performance of a character print operation where the present mechanism drives a printer structure as in the aforementioned Bethune application. During this dwell interval and while the lever 60 has its counterclockwise angular displacement halted by its associated stop member 64 and guide bushing 84, slight further straightening of the arms 40 and 41 of the associated toggle joint structure 42 displaces the toggle arm 40 to the right to effect slight compression of the helical wire spring 55. The initial or static compression of each such spring, established by the position of the nut 57 on the machine screws 49, is adjusted to provide a spring bias force of adequately large value to ensure that in driving the load coupled to the output shaft 63 the pivot pin 43 remains stationary until the associated lever 60 is halted by its stop member 64 and guide bushing 84. During completion of the cycle of rotation of the input drive shaft 10, the lever 60 of the structure A is pivoted clockwise under drive of the connecting link 27 and toggle joint structure 42 until it returns to its position of rest established by engagement of the stop member 66 with the guide bushing 85. The code electromagnet armature 70 may now once more pivot into latching engagement with the notch 69 of this lever should the code electromagnet 72 of the strucure A be deenergized at this time. This return movement of the lever 60 operates through the associated planetary pinion gear 80 and the sector gear 106 to return the output driven shaft 63 to its at-rest or home position.

Upon energization of the code electromagnet 72 associated with the structure B, and assuming that all other code electromagnets remain deenergized at this time, it will be evident that cycle of rotation of the input drive shaft 10 operates in the manner just described to rotate the output drive shaft 63 through a reciprocal cycle of angular displacement by an amount preselectably established by the adjustment of the guide bushing 84 associated with the operated lever 60 of the structure B. In this instance, however, the planetary motion of the pinion gear 80 of the structure B is transmitted through the intervening bevel sector gear 103 and planetary bevel pinion gear 80 of the structure A to the output bevel sector gear 106. This causes angular drive motion of the output driven shaft 63 in clockwise direction (as viewed from the end of the shaft), which is thus opposite to the direction of drive last described as effected by the structure A. In similar manner, it will be evident that the structure C effects a reciprocal cycle of angular displacement of the output driven shaft 63 in the same counterclockwise direction as is effected by the structure A, the range of such angular motion being preselectably established by the adjusted position of the guide bushing 84 of the structure C. Likewise, the structure D effects a reciprocatory drive motion of the output driven shaft 63 in clockwise direction (the same direction as is effected by the structure B) and over an angular range established by the preselected adjustment of the guide bushing 84 of the structure D.

It will thus be evident that concurrent energization of any two or more of the code electromagnets 72 of the structures A–D effects an aggregate amount of reciprocal angular motion of the output driven shaft 63, the aggrate range and direction of motion being a summation of the individual magnitude of shaft displacement and direction in clockwise or counterclockwise sense of the displacement contributed by each such structure. For example, and by preselected adjustment of the guide bushings 84 associated with each of the structures A–D, the structure A may be arranged to contribute one unit and the structure B two units of counterclockwise angular motion of the output shaft 63 while the structure B may similarly be arranged to contribute three units and the structure D four units of clockwise angular displacement of the output shaft 63. Using these representative values of displacement and directions of displacement, selective energization of the several code electromagnets 72 alone or in permutational combinations results in reciprocation of the output shaft 63 in equal-valued steps through an angular range having a maximum of three units of counterclockwise displacement to seven units of clockwise displacement. In a typical application, such as one wherein the present drive mechanism is used to provide horizontal type-box positioning to select any of several rows of type as in the aforementioned Bethune application, the structures A and C may respectively provide one and two units of counterclockwise displacement of the output shaft 63 while the structures B and D may each provide two units of clockwise displacement of the output shaft 63. For this application and by always concurrently energizing the code electromagnets associated with the structures B and D so that these structures concurrently provide an aggregate total of four units of clockwise displacement of the output shaft 63, the available code electromagnet energizations may provide unit step displacement of the output shaft from a maximum of three units of counterclockwise displacement to a maximum of four units of clockwise displacement thereby to provide a total of eight unit-valued output shaft displacements.

The drive mechanism of the present invention has utility not only in providing unit-valued step angular displacements of the output driven shaft 63 in clockwise and counterclockwise directions as just described, but may additionally be used in an application which requires that the unit-valued step displacements of the output drive shaft 63 always occur in the same direction from its at-rest or home position or may even require that in such unidirectional unit-step angular motion each available unit-valued step be accompanied by a uniform value of incremental step motion. An application of the latter type is found in the aforementioned Bethune application wherein the present mechanism is used to provide vertical positioning of a type box to select successive rows of type but with an incremental displacement of the type box to raise each selected row of type to the typing line, thereby to enable the at-rest position of the type box to lie below the type line and enable visual inspection of each character typed. For an application of this nature, the structures A and C may contribute one unit and two units, respectively, of counterclockwise angular motion of the output shaft 63 whereas the structures B and D may contribute three units and four units, respectively, of clockwise angular displacement of the output shaft 63. In addition, the guide bushing 84 of the structure B may be so preselectably adjusted that this structure contributes an incremental displacement in addition to the three units of displacement which it would otherwise provide. Now by always energizing the code electromagnet 72 associated with the structure B alone or appropriately energizing it concurrently with one or more of the other electromagnets 72, the output shaft 63 will be displaced from its at-rest or home position only in clockwise direction and by a displacement step either equal only to the incremental displacement provided by the structure B or by unit-valued steps having values 1 through 7 each accompanied by the incremental displacement contributed by the structure B.

While the foregoing description of the construction and operation of the aggregate motion drive mechanism considers adjustments of the guide bushings 84 of the structures A–D to provide equal-valued unit step drive displacements of the output shaft 63, it will be clear by analogy to the particular application last described that the step drive displacements may if desired have fractionally proportional values according to the individual adjustments of the guide bushings 84 in relation to one another.

For those of the structures A–D which contribute lesser amounts of angular displacement of the output driven shaft 63, it is preferable that such structures minimize the ranges of motion of their mechanical components by employing eccentric cam members 26 of such configuration as to provide lesser amounts of throw of their associated connecting links 27. This minimizes the cyclic storage of energy by compression of the springs 55 of such structures and somewhat reduces the input drive power requirements while at the same time minimizing the mechanical strain and wear to which moving components are subjected in operation. It also tends to make for quieter operation.

It will be apparent from the foregoing description of the invention that an aggregate motion drive mechanism embodying the invention is of sturdy construction capable of transmitting large drive forces from a rotary input shaft to angular reciprocal motion of an output shaft which is reciprocally moveable over ranges of angular motion each having precisely selectable range limits and each being easily and readily selectable and controlled by relatively low power range-selection devices preferably of the electrically oprated type enabling angular range selection and control from a remote point. A mechanism embodying the invention has the further advantages that, by cyclic storage of input drive power and cyclic transmission of the stored power through the mechanism to the output shaft, the mechanism of the invention more uniformly loads the input drive source throughout an operating cycle and is characterized by a higher cyclic operating rate than heretofore readily attainable in rotary to reciprocal drive mechanism capable of transmitting large values of drive power.

While a specific form of the invention has been described for purposes of illustration, it is contemplated that numerous changes may be made without departing from the spirit of the invention.

What is claimed is:

1. An aggregate motion drive mechanism comprising:
a plurality of toggle joint structure each having articulated toggle arms,
a corresponding plurality of reciprocal power drive members each connected to the toggle joint of an individual one of said structure,
means including an input power drive shaft for reciprocating said members in unison through reciprocal cycles of motion to displace the articulated arms of said toggle joint structures by toggle motion between two positions thereof,
a plurality of displaceable aggregate motion control elements positionally arranged in order from a first to a last thereof and mechanically coupled to one arm of an individual one of said toggle joint structures for displacement of individual ones of said elements by individual toggle displacements of said one toggle arm,
means mechanically coupling said elements serially in said order and responsive to the displacement of each thereof to provide an aggregate motion output therefrom,
latch means individual to each said control element to restrain and permit displacement motion thereby, and
restraining means individual to said toggle joint structure for restraining and permitting toggle displacement of the other arm thereof whenever the associated control element is respectively permitted to have displacement motion and restrained therefrom by said latch means.

2. An aggregate motion drive mechanism comprising:
a plurality of toggle joint structures each having articulated toggle arms,
a corresponding plurality of reciprocal power drive members each connected to the toggle joint of an individual one of said structures,
means including an input power drive shaft for reciprocating said drive members in unison through a reciprocal cycle of motion to displace the articulated arms of said toggle joint structure by toggle motion between differing angled positions,
an output driven shaft,
a gear train including a plurality of differential gear mechanism connected in series with one another in order from a first gear to an output gear connected to said output shaft for differential aggregate drive of said output shaft,
means mechanically coupling the differential drive gear of each of said gear mechanisms to one arm of an individual one of said toggle joint structures for drive of said each differential gear by toggle displacement of said one toggle arm,
latch means individual to each said toggle joint structure and operable to latch and unlatch said one arm thereof respectively to restrain and permit differential drive thereby, and
restraining means individual to each said toggle joint structure for restraining toggle displacement of the other arm thereof whenever said one arm thereof is permitted by said latch means to move in effecting said differential drive thereby.

3. An aggregate motion drive mechanism according to claim 2 wherein said restraining means is comprised by a spring individual to each said toggle joint structure and provides a spring bias force of sufficiently large value as to prevent toggle displacement of said other arm thereof during any toggle displacement of said one arm thereof.

4. An aggregate motion drive mechanism according to claim 2 wherein said mechanical coupling means and said restraining means are connected to and movably support the ends of said one arm and said other arm, respectively, of the toggle joint structure individual thereto.

5. An aggregate motion drive mechanism according to claim 2 wherein said first gear is mechanically connected to an adjacent differential gear mechanism and is mechanically coupled for rotational motion to one arm of an individual one of said toggle joint structures.

6. An aggregate motion drive mechanism according to claim 2 wherein said differential gear mechanisms are of the bevel gear type having a planetary gear coupled by said mechanical coupling means to said one arm of the toggle joint structure individual thereto for planetary motion drive of said planetary gear by toggle motion of said one toggle arm.

7. An aggregate motion drive mechanism according to claim 2 wherein mechanical energy storage means stores mechanical energy received from said reciprocal power drive members during at least a terminal portion of each said reciprocal cycle of motion thereof and delivers stored mechanical energy to said reciprocal power drive members during at least an initial portion of each said reciprocal cycle of motion thereof.

8. An aggregate motion drive mechanism according to claim 7 wherein said mechanical energy storage means is comprised by a spring individual to each said reciprocal power drive member.

9. An aggregate motion drive mechanism according to claim 8 wherein each said spring encircles a support member connected to and reciprocal with the toggle joint of an individual one of said toggle joint structures and has one spring end engaging a stationary stop member apertured to guide said support member and an opposite spring end engageable with a collar provided on said support member.

10. An aggregate motion drive mechanism according to claim 6 wherein said mechanical coupling means comprises a plurality of levers rotationally journaled on said output shaft and each rotationally supporting the planetary gear of an individual one of said differential gear mechanisms and having an arm connected to and movably supporting the end of said one arm of an individual one of said toggle joint structures.

11. An aggregate motion drive mechanism according to claim 10 wherein said latch means is comprised by an electromagnet individual to each of said levers and having an armature operable between latched and unlatched engagement with a latch notch provided on said lever arm.

12. An aggregate motion drive mechanism according to claim 2 wherein fixed stop members limit to individual preselected values the range of drive motion of individual ones of said differential gears by toggle displacement of said one toggle arm individual thereto.

13. An aggregate motion drive mechanism according to claim 10 wherein stop structures limit to individual preselected values the range of angular motion of said levers and thereby limit to preselected values the range of planetary drive motion of said planetary gears by said one toggle arm of said toggle joint structures.

14. An aggregate motion drive mechanism according to claim 10 wherein each said lever includes a second arm and the angular range of motion of said each lever is limited to a preselected value by a stop structure including stop members connected to said first and second lever arms and movable therewith into engagement with individual ones of fixed stop members.

15. An aggregate motion drive mechanism according to claim 2 wherein said power drive members comprise a connecting link apertured at one end and pivotally connected at their opposite ends to individual ones of said toggle joints, and wherein said input power drive shaft drivingly supports longitudinally spaced eccentric drive cams received in the end aperture of individual ones of said connecting link.

References Cited

UNITED STATES PATENTS

| | | | |
|---|---|---|---|
| 2,844,965 | 7/1958 | Stelljes et al. | 74—81 |
| 2,893,251 | 7/1959 | McWethy | 74—81 |
| 2,972,259 | 2/1961 | Favre | 74—520 |
| 3,165,291 | 1/1965 | Osen | 74—520 |
| 3,172,182 | 3/1965 | Assmann | 74—520 |
| 3,142,185 | 7/1964 | Knowles | 74—520 |

FRED C. MATTERN, Jr., *Primary Examiner.*

W. S. RATLIFF, Jr., *Assistant Examiner.*

U.S. Cl. X.R.

74—520

PO-1050
(5/69)

UNITED STATES PATENT OFFICE
CERTIFICATE OF CORRECTION

Patent No. 3,452,623            Dated July 1, 1969

Inventor(s)          Donald G. Bastian

It is certified that error appears in the above-identified patent and that said Letters Patent are hereby corrected as shown below:

Column 9, line 15, cancel "structure" and add --structures--;
         Line 37 should be indented with respect to the preceding line;
         Line 57, cancel "mechanism" and add --mechanisms--.

SIGNED AND
SEALED
SEP 22 1970

(SEAL)
Attest:

Edward M. Fletcher, Jr.
Attesting Officer

WILLIAM E. SCHUYLER, JR
Commissioner of Patents